(12) United States Patent
Henmi et al.

(10) Patent No.: US 12,373,426 B2
(45) Date of Patent: Jul. 29, 2025

(54) SEARCH SENTENCE GENERATION SYSTEM AND SEARCH SENTENCE GENERATION METHOD

(71) Applicant: Universal Entertainment Corporation, Tokyo (JP)

(72) Inventors: Takuo Henmi, Tokyo (JP); Junichi Sato, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 803 days.

(21) Appl. No.: 17/059,831

(22) PCT Filed: May 10, 2019

(86) PCT No.: PCT/JP2019/018693
§ 371 (c)(1),
(2) Date: Nov. 30, 2020

(87) PCT Pub. No.: WO2019/235131
PCT Pub. Date: Dec. 12, 2019

(65) Prior Publication Data
US 2021/0263915 A1    Aug. 26, 2021

(30) Foreign Application Priority Data
Jun. 4, 2018  (JP) ................. 2018-107217

(51) Int. Cl.
| G06F 7/00 | (2006.01) |
| G06F 16/00 | (2019.01) |
| G06F 16/242 | (2019.01) |
| G06F 40/253 | (2020.01) |
| G06F 40/268 | (2020.01) |

(52) U.S. Cl.
CPC .......... G06F 16/243 (2019.01); G06F 40/253 (2020.01); G06F 40/268 (2020.01)

(58) Field of Classification Search
None
See application file for complete search history.

(56) References Cited

U.S. PATENT DOCUMENTS 6,615,172 B1    9/2003 Bennett et al.
11,151,249 B2*  10/2021 Coroiu .................. G06F 21/564
(Continued)

FOREIGN PATENT DOCUMENTS

| JP | H08339383 A | 12/1996 |
| JP | H11328194 A | 11/1999 |

OTHER PUBLICATIONS

International Search Report and Written Opinion dated Jul. 16, 2019, issued in International Application No. PCT/JP2019/018693.
(Continued)

*Primary Examiner* — Tuan A Pham
(74) *Attorney, Agent, or Firm* — KMF Patent Services, PLLC; Kenneth M. Fagin

(57) ABSTRACT

To provide a search sentence generation system capable of generating an appropriate search sentence automatically based on a natural sentence inputted by a user. A search sentence generation server 300 determines a word corresponding to an operator and a target word adjacent to the word by analyzing a received input sentence and generates a search sentence corresponding to the input sentence based on the determined words in this manner.

11 Claims, 11 Drawing Sheets

(56) References Cited

U.S. PATENT DOCUMENTS

| | | | | |
|---|---|---|---|---|
| 2006/0155673 A1* | 7/2006 | Houck | ................. | G06F 16/243 |
| 2007/0106499 A1* | 5/2007 | Dahlgren | .............. | G06F 16/243 |
| | | | | 704/10 |
| 2010/0057709 A1* | 3/2010 | Kawanaka | ............ | G06F 16/951 |
| | | | | 707/E17.108 |
| 2010/0094615 A1* | 4/2010 | Roh | ...................... | G06F 40/211 |
| | | | | 704/2 |
| 2015/0278198 A1* | 10/2015 | Andreev | ............... | G06F 40/268 |
| | | | | 704/9 |
| 2015/0339574 A1 | 11/2015 | Allen et al. | | |
| 2016/0098394 A1* | 4/2016 | Bruno | .................... | G06F 40/30 |
| | | | | 704/9 |
| 2016/0147737 A1* | 5/2016 | Ryu | ...................... | G06F 40/284 |
| | | | | 704/9 |
| 2019/0205445 A1* | 7/2019 | Yazdani | ................ | G06F 16/951 |

OTHER PUBLICATIONS

Translation of arguments over JPA No. 8-339383 (cited in ISR and previously in Nov. 30, 2020, IDS) which were presented in connection with corresponding Japanese application, which argument led to allowance in Japan of new claims 7-10 filed herewith.

* cited by examiner

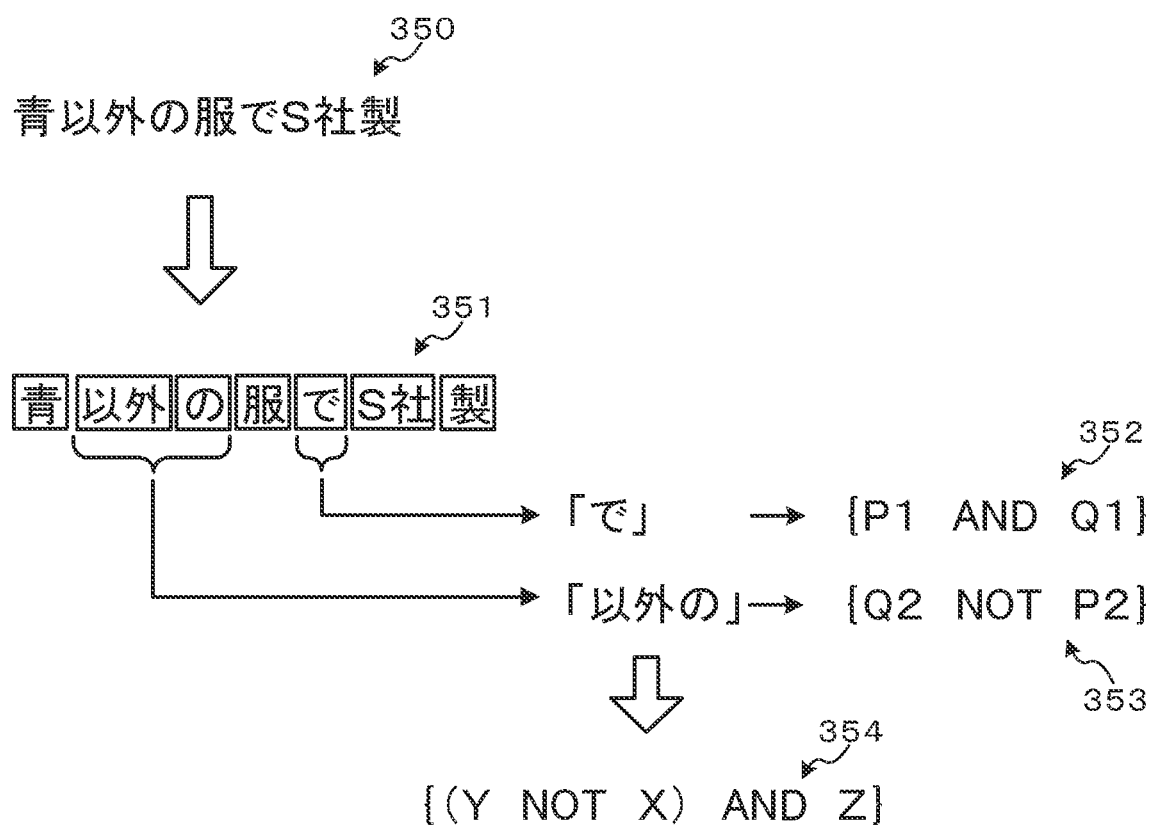

FIG. 6

| CASE | OPERATION DISCRIMINATION | OPERATOR | TYPE | EXAMPLE OF CORRESPONDING WORD | EXAMPLE OF INPUT SENTENCE | GENERATED SEARCH SENTENCE |
|---|---|---|---|---|---|---|
| 1 | LOGICAL OPERATION | NOT | NEGATIVE | …ない、…以外の | 苦くない薬 | 薬 NOT 苦い |
| 2 | LOGICAL OPERATION | AND | LOGICAL PRODUCT | …で、…の、…て | 赤くて長袖の服 | 服 AND 赤い AND 長袖 |
| 3 | LOGICAL OPERATION | OR | LOGICAL SUM | AもしくはB、A又はB、AかB | 赤いもしくは青い服 | 服 AND (赤い OR 青い) |
| 4 | LOGICAL OPERATION | NAND | NEGATIVE LOGICAL PRODUCT | (AであるB)以外の、AでないBでない | 苦い錠剤以外の薬 | 薬 AND (苦い NAND 錠剤) |
| 5 | LOGICAL OPERATION | NOR | NEGATIVE LOGICAL SUM | (AとB)以外の、Aでもなく、Bでもない | 赤と青以外の服 | 服 AND (赤 NOR 青) |
| 6 | LOGICAL OPERATION | XOR, EOR | EXCLUSIVE LOGICAL SUM | AかBのいずれかのみ | 単色で、赤もしくは青の服 | 服 AND (赤 XOR 青) |
| 7 | COMPARISON OPERATION | == | EQUAL | Aが[数量] | 価格が1万円 | price==10000 |
| 8 | COMPARISON OPERATION | != | NOT EQUAL | Aが[数量]ではない | 価格が1万円ではない | price!=10000 |
| 9 | COMPARISON OPERATION | > | GREATER THAN | Aが[数量]より高い | 価格が1万円より高い | price>10000 |
| 10 | COMPARISON OPERATION | < | LESS THAN | Aが[数量]より小さい | 価格が1万円より小さい | price<10000 |
| 11 | COMPARISON OPERATION | >= | EQUAL TO OR GREATER THAN | Aが[数量]以上 | 価格が1万円以上 | price>=10000 |
| 12 | COMPARISON OPERATION | <= | EQUAL TO OR LESS THAN | Aが[数量]以下 | 価格が1万円以下 | price<=10000 |

SEARCH SENTENCE GENERATION SYSTEM AND SEARCH SENTENCE GENERATION METHOD

The present application pertains to analysis of sentences, phrases, expressions, etcetera that are input into a computerized system. The exemplary embodiments illustrating inventive concepts are based on Japanese sentences, phrases, expressions, etcetera. Because certain Japanese characters and morphemes, which are identified and assessed in the course of the inventive analysis, do not have direct, word-for-word or word-for-character translations into English (in the same way, for example, as "apostrophe-s" in English denotes possession but does not have meaning "standing alone" that can be translated into Japanese as a separate word), the description below retains the Japanese text when specific examples are being described. English-language translations, or explanatory characterizations of the intended meaning of the Japanese text, are provided in brackets in association with the Japanese text.

TECHNICAL FIELD

The present invention relates to a search sentence generation system generating a search sentence based on a natural sentence inputted by a user.

BACKGROUND ART

In recent years, a lot of information is disclosed on Internet, and an Internet user can specify a desired WEB page from an enormous number of WEB pages on Internet by inputting a keyword into a search engine to browse necessary information.

Moreover, a user of a commercial database or the like creates a search expression including a keyword, a logical operator, brackets and so on to thereby acquire target information from the commercial database.

However, when desired information is acquired by the search, input of the keyword or creation of the search expression including the keyword, the logical operator, the brackets and so on is complicated, and it is difficult for a person not accustomed to creating the search expression to obtain a search result intended to be obtained by the search.

In view of the above, for example, an information searching system capable of creating a search expression automatically based on a natural sentence inputted by the user is proposed (refer to Patent Literature 1).

The information searching system creates the search expression based on a search question in the natural sentence inputted by the user. More specifically, the search expression using an operator and so on is created by referring to a search word dictionary storing synonyms, related words, and hierarchy relationship of terms included in the search question, and a database as a search target is searched by using the created search expression. The system is configured to inquire the user of whether the number of answers is appropriate or not after the search result is obtained and to create the search expression again by using the search word dictionary in accordance with a result of a reply to the inquiry.

CITATION LIST

Patent Literature

PTL 1: JP-A-H05-128158

SUMMARY OF INVENTION

Technical Problem

The search expression is created based on a search sentence configured by a natural sentence in the above information searching system, and the keyword or the operator included in the search expression is configured to be appropriately changed in accordance with the result of the replay to the inquiry from the user.

For example, when the user determines that the number of answers in the search result is small, the information searching system rewrites keywords by adding a keyword (in parallel) or putting the keyword in a high order by referring to the search word dictionary, and by changing the operator from "AND" to "OR" to create the search expression capable of obtaining a larger number of answers.

Such information searching system is effective from an aspect of assisting the user not accustomed to creating the search sentence; however, there is a case, on the other hand, where true intention or a nuance of a search included in the natural sentence is not correctly expressed.

In search engines of Internet generally used at present, for example, when the user inputs search words such as "華々しくない" [translates to "not brilliant"] and "彩りが良くない" [translates to "poor coloring"], searching is performed based on keywords of "華々しい" ["brilliant"] and "彩り" ["coloring"], and negative meaning of search words inputted by the user may be excluded.

Also in the search engines of Internet, there is a case where the true intention or the nuance of the search included in the natural sentence is not correctly expressed as described above.

In view of the above, an object the present invention is to provide a search sentence generation system capable of generating an appropriate search sentence automatically based on the natural sentence inputted by the user.

Another object of the present invention is to provide a search sentence generation system capable of generating a search sentence on which the true intention and the nuance of the search included in the natural sentence is reflected based on the natural sentence inputted by the user.

Solution to Problems

The present invention provides a search sentence generation system and a search sentence generation method described as follows.

An invention according to a first aspect of the present invention includes the following configuration.

A search sentence generation system (for example, a search sentence generation system 11) includes an input sentence receiving unit receiving an input sentence of a natural sentence inputted by a user, an input sentence analysis unit analyzing the input sentence and decomposing the input sentence into plural words, a determination unit determining a word (for example, "で" ["and"] or "以外の" ["other than"]) corresponding to an operator (for example, AND or NOT) based on the plural words and determining a target word relating to the determined word, and a search sentence generation unit generating a search sentence corresponding to the input sentence by using a set of the operator corresponding to the determined word and the target words determined to relate to the word.

According to the configuration of the present invention, it is possible to generate an appropriate search sentence automatically based on the natural sentence inputted by the user, and the user is capable of obtaining an intended search result without creating a complicated search sentence even when the user is not accustomed to creating the search sentence or does not have knowledge about a search expression.

An invention according to a second aspect of the present invention includes the following configuration in the first aspect.

The determination unit may be configured to determine a word corresponding to an operator of a negative logical operation based on a given determination standard (for example, when a word such as "以外の" ["other than"] or "ない" ["not"] is extracted in the analyzed input sentence, an operator "NOT" is associated with the word).

According to the configuration of the present invention, the intended search result can be obtained even when the input sentence of the user contains a negative condition.

An invention according to a third aspect of the present invention includes the following configuration in the first aspect.

The search sentence generation unit may be configured to generate the search sentence so that priority of a logical operation by a given operator is decided based on relationship between the operator and the target words in respective sets of the operators corresponding to the determined words and the target words determined to relate to the words (for example, when "服 NOT 青" ["clothes NOT blue"] as a search sentence 364 and "服" ["clothes AND"] as (3) in a partial search sentence 363 are generated in FIG. 8B, a target word "服" ["clothes"] is common in both sentences, and "服" ["clothes"] has a relation of being modified by the operator "NOT" and a target word "青" ["blue"] in the search sentence 364; therefore, both sentences are simplified by "服" ["clothes"] to thereby generate "服 NOT 青) AND" ["(clothes NOT blue) AND"] as a search sentence 365.

According to the configuration of the present invention, it is possible to generate an appropriate search sentence automatically based on the natural sentence inputted by the user.

An invention according to a fourth aspect of the present invention includes the following configuration in the first aspect.

The determination unit may be configured to determine the words which may correspond to the operator one by one concerning the plural words (for example, words which may correspond to the operator are acquired one by one from the analysis result of the input sentence in Step S54 of FIG. 7), and the search sentence generation unit may be configured to generate a search sentence concerning the determined word every time the word corresponding to the operator is determined and to integrate the search sentence with a search sentence already generated (for example, Step S56 of FIG. 7).

According to the configuration of the present invention, it is possible to generate an appropriate search sentence automatically based on the natural sentence inputted by the user.

An invention according to a fifth aspect of the present invention includes the following configuration.

A search sentence generation method executed in a search sentence generation server generating a search sentence based on an input sentence of a natural sentence inputted by a user, which includes an input sentence receiving step of receiving an input sentence, an input sentence analyzing step of analyzing the input sentence and decomposing the input sentence into plural word, a determination step of determining a word corresponding to an operator based on the plural words and determining a target word relating to the determined word, and a search sentence generation step of generating a search sentence corresponding to the input sentence by using a set of the operator corresponding to the determined word and the target words determined to relate to the word.

According to the configuration of the present invention, it is possible to generate an appropriate search sentence automatically based on the natural sentence inputted by the user, and the user is capable of obtaining the intended search result without creating the complicated search sentence even when the user is not accustomed to creating the search sentence or does not have knowledge about the search expression.

Advantageous Effects of Invention

In the search sentence generation system according to the present invention, it is possible to generate an appropriate search sentence automatically based on the natural sentence inputted by the user, and the user can obtain a desired search result by inputting the sentence in such a way as to make an inquiry in a normal conversation without creasing a complicated search sentence.

Also in the search sentence generation system according to the present invention, it is possible to generate a search sentence on which true intention or a nuance of the search included in the natural sentence is reflected based on the natural sentence inputted by the user; therefore, the user can obtain the intended search result without creating the complicated search sentence even when the user is not accustomed to creating the search sentence or does not have knowledge about the search expression.

BRIEF DESCRIPTION OF DRAWINGS

FIGS. 5A and 5B are views illustrating an outline of search sentence generation processing of a search sentence generation server according to the first embodiment of the present invention;

FIG. 6 is a chart showing search sentence generation examples by the search sentence generation server according to the first embodiment of the present invention;

DESCRIPTION OF EMBODIMENTS

First, an information providing system 1 including a search sentence generation system 11 according to a first embodiment of the present invention will be explained with reference to the drawings.

Figure 1:
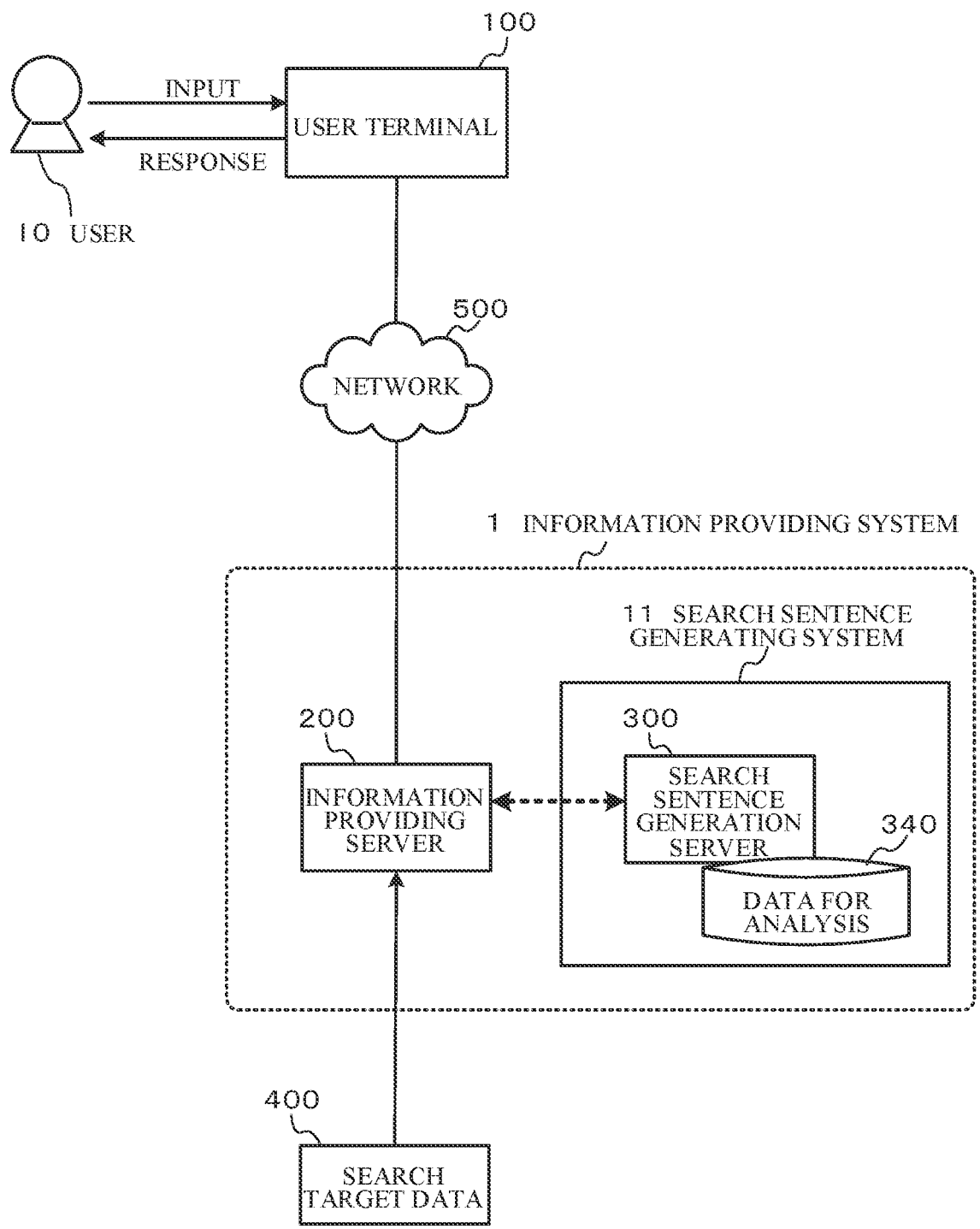
FIG. 1 is a diagram showing an outline of an information providing system including a search sentence generation system according to a first embodiment of the present invention.

FIG. 1 is a diagram showing an outline of the information providing system 1 that realizes a conversation with a user by providing a response corresponding to an input by the user. The information providing system 1 is configured to include the information sentence generation system 11 according to the first embodiment of the present invention.

A user 10 inputs a character string in an input area of a given WEB page displayed by a WEB browser executed in a user terminal 100 (for example, by using a keyboard or a touch panel of the user terminal 100). Here, the character string inputted by the user 10 is generally a search sentence for performing information search with respect to a search target, which is a natural sentence expressed by natural language.

In this case, the natural sentence relating to such information search is assumed to be inputted from the user 10, and the input from the user will be expressed as an "input sentence" below. Note that it is not always necessary that the input sentence has a form of a sentence as long as it can be used for searching. It is also not necessary that the input sentence is a question sentence or has a question form such as "苦くない薬は何?" ["which medicine is not bitter?"]. Various forms of input sentences such as an input sentence making part of a question sentence, that is for example, "苦くない薬" ["non-bitter medicine"] can be received.

The user 10 exchanges messages with the information providing system 1 in a conversation style, and a search result of searching executed based on an input sentence as a response to the input sentence inputted by the user 10 is displayed on the user terminal 100.

The WEB browser executed in the user terminal 100 is configured to display the input area to which the input sentence is inputted and the search result in the embodiment; however, another application executed in the user terminal 100 may display the input area and the search result.

Next, the input sentence inputted from the user terminal 100 by the user 10 is provided to the information providing system 1 by the WEB browser of the user terminal 100 through a network 500. Here, the network 500 is a network including, for example, Internet.

The information providing system 1 is configured to include an information providing server 200 and the search sentence generation system 11. The search sentence generation system 11 includes a search sentence generation server 300, and the search sentence generation server 300 includes a data for analysis 340 for analyzing the input sentence.

When the information providing server 200 of the information providing system 1 receives the input sentence from the user terminal 100, the information providing server 200 transmits the input sentence to the search sentence generation system 11 and receives the search sentence generated there from the search sentence generation system 11. When the search sentence generation system 11 receives the input sentence, the search sentence generation server 300 generates the search sentence based on the received input sentence by referring to the data for analysis 340 or the like.

When the information providing server 200 of the information providing system 1 receives the generated search sentence from the search sentence generation system 11, the information providing server 200 executes searching with respect to search target data 400 by using the search sentence, and transmits the search result to the user terminal 100.

The search target data 400 is a database arranged outside the information providing system 1 in the embodiment; however, the search target data 400 may be data included in the information providing system 1. The search target data 400 may also be a database storing, for example, index information concerning resources accessible through Internet. When such database is searched, a list of WEB pages matching conditions of the search sentence, link information for the WEB pages, the contents of respective WEB pages and so on can be displayed on the user terminal 100.

The search target data 400 may be configured to include merchandise provided by companies, inventory information of the merchandise and so on. The search target data 400 can be thus configured to have various contents.

Here, when the information providing system 1 is provided as a system usable by unspecified users, a general user browsing the WEB page, a general user asking a question (about merchandise, services and so on) of companies or organizations providing WEB sites, and other users are assumed as the users 10, and a smart phone, a PC (personal computer) or the like possessed by the user 10 which can be connected to Internet or the like is normally assumed as the user terminal 100.

FIG. 1 shows a configuration in which the user 10 inputs the input sentence in the input area of the WEB site (for example, by using the keyboard or the touch panel of the user terminal 100) and transmits the input sentence to the information providing system 1; however, the information providing system 1 may receive the input sentence in any method and route. For example, when the user 10 asks a question relating to the search by voice, it is possible to perform voice recognition processing to the voice to be converted into a character string and to provide the converted character string to the information providing system 1 as the input sentence. Moreover, it can be considered that a printed question item relating to the search or the like is converted into a character string by OCR (optical character recognition) and that the converted character string is provided to the information providing system 1 as the input sentence.

The response sentence from the information providing system 1 may be provided to the user terminal 100 not only by character information indicating the search result but various methods and routes such as figures, voice and video.

The information providing server 200 according to the embodiment also has a function of a WEB server performing data transmission/reception by the WEB browser and a protocol such as http executed in the user terminal 100 and operating so as to display a given WEB page by the WEB browser.

The information providing server 200 and the search sentence generation server 300 are shown as independent computers respectively in this case; however, it is also possible to configure these servers by plural computers which execute the same functions while allocating these functions. It is also preferable that the information providing server 200 and the search sentence generation server 300 are integrated to be realized as one computer.

The example in which the search sentence generation system 11 according to the first embodiment of the present invention is incorporated in the above information providing system 1 is shown in FIG. 1, and the search sentence generation system 11 can be used for other various systems. The search sentence generation system 11 is a system receiving an input sentence relating to the search at least part of which is a natural sentence, and generating an appropriate search sentence based on the input sentence.

Figure 2:
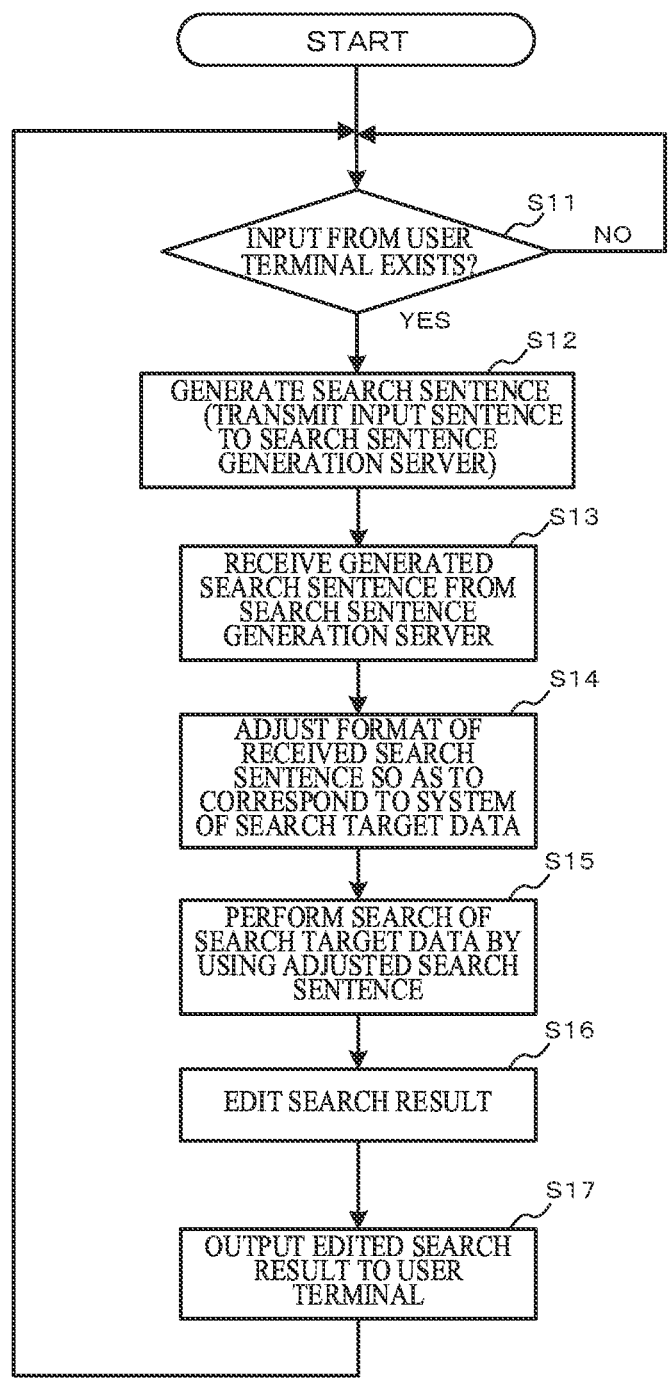
FIG. 2 is a flowchart illustrating response sentence output processing in the information providing system of FIG. 1.

FIG. 2 is a flowchart showing the flow of response sentence output processing in the information providing system 1 according to the embodiment. In the processing, the information providing server 200 searches the contents of the search target data 400 based on the input sentence inputted by the user 10 as described above and performs control so as to display the search result on the user terminal 100.

First, the information providing server 200 determines whether the input sentence of the user 10 has been received from the user terminal 100 or not in Step S11. When the input sentence has not been received (NO in Step S11), the determination processing is repeated. When the input sentence has been received (YES in Step S11), the process proceeds to Step S12.

In Step S12, the information providing server 200 transmits the input sentence of the user 10 received from the user terminal 100 to the search sentence generation server 300, where the search sentence based on the input sentence is generated.

Next, the generated search sentence is received from the search sentence generation server 300 in Step S13 and a format of the received search sentence is adjusted so as to correspond to a data management system of the search target data 400 in Step S14. For example, the search sentence is generated in a prescribed format in the search sentence generation server 300. When the data management system of the search target data 400 is configured to receive a search sentence in a format different from the format used in the search sentence generation server 300, the format of the generated search sentence is changed so as to correspond to that format. For example, there is a case where it is necessary to form the search sentence in a SQL format containing a SELECT sentence in a commercial database, or there is a case where it is necessary to form the search sentence to be used in a search engine of Internet.

Next, the contents of the search target data 400 is searched by using the adjusted search sentence to acquire the search result in Step S15. The search result shows, for example, a list of items satisfying conditions of the search sentence and link information to data indicating the details of respective items. In a case where the search target data 400 is a database storing indexes concerning resources accessible through Internet, the search result shows a list of WEB pages satisfying conditions of the search sentence and link information to respective WEB pages.

Next, the information providing server 200 edits the received search result in Step S16. For example, when the user terminal 100 transmits the input sentence of the user 10 by the WEB browser, WEB pages configured to display the contents of the search result are edited (by html language or the like), after that, the information providing server 200 controls so as to output the edited search result to the user terminal 100 in Step S17.

Figure 3:
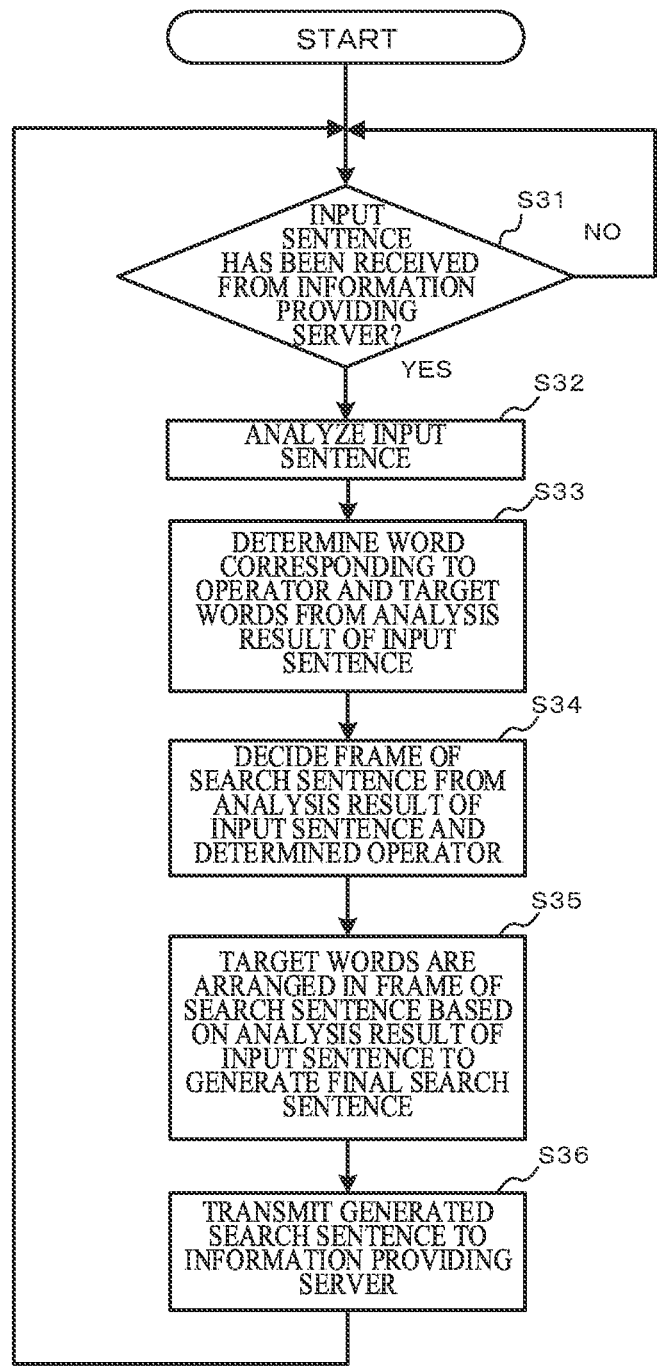
FIG. 3 is a flowchart illustrating search sentence generation processing of the search sentence generation system according to the first embodiment of the present invention.

FIG. 3 is a flowchart showing the flow of search sentence generation processing executed by the search sentence generation server 300 according to the first embodiment. In the processing, when the input sentence of the user 10 is received from the information providing server 200, the search sentence is generated in accordance with prescribed rules based on the input sentence and the generated search sentence is transmitted to the information providing server 200 as described above.

First, the search sentence generation server 300 determines whether the input sentence of the user 10 has been received from the information providing server 200 or not in Step S31. When the input sentence has not been received (NO in Step S31), the determination processing is repeated. When the input sentence has been received (YES in Step S31), the process proceeds to Step S32.

In Step S32, the search sentence generation server 300 analyzes the received input sentence and extracts plural words from the input sentence. In the embodiment, morphological analysis is performed by using a morphological database included in the data for analysis 340. According to the analysis, the input sentence is decomposed into minimum units (morphemes) having meanings. For example, respective words are extracted (decomposed) by being classified into parts of speech such as a noun, a verb, a particle, an auxiliary verb, and an adjective. Although the morphological analysis is performed in the embodiment, the input sentence may be analyzed in various methods such as analysis in which collation with a given keyword and a character string pattern is performed, and analysis in which comparison with words registered in a dictionary is performed, thereby extracting plural words.

Additionally, words not directly relating to a construction of the search sentence to be generated are deleted or adjusted at this time. For example, in the case of the input sentence "苦くない薬は何?" [which medicine is not bitter?"], "は" ["is"], "M" ["which" or "what"], "?" and the like are not reflected on the search sentence; therefore, they are deleted in this stage. The nouns and adjectives are converted into forms (styles) suitable for being used in the search sentence according to need.

Next, a word corresponding to an operator included in the search sentence is determined from the analysis result (decomposed words) of the input sentence in Step S33. At this time, target words relating to the word corresponding to the operator are also determined. Here, the target words are words indicating elements necessary for operation using the operator, which are a noun, an adjective, and so on (basically) adjacent to the word determined to correspond to the operator. The target words can be defined as search target items or search values in the search target data 400 in the search sentence.

For example, when successive morphemes such as "以外" and "の" are extracted from part of the input sentence, a term "以外の" ["other than"] obtained by coupling these two morphemes is determined to correspond to a logical operation NOT also in consideration of adjacent (for example, preceding and succeeding) target words including nouns and so on. Moreover, when a morpheme such as "で" is extracted from part of the input sentence, the word "で" is determined to correspond to a logical operation AND also in consideration of adjacent target words including nouns and so on.

Moreover, the word corresponding to the operator is determined by referring to the data for analysis 340 according to need and determining whether an adjective is in a negative form or not, and consequently, NOT may be put into the search sentence, or to which operator of the logical operation the word corresponds can be determined according to kinds of target words (for example, kinds of parts of speech) adjacent to the word in the embodiment.

According to the above configuration of the present invention, the system does not simply take out a specific character string in the input sentence and associate the character string with the operator; therefore, the true intention and the nuance of the input sentence can be correctly extracted and reflected on the search sentence. For example, in the related-art technique, a character string "と" ["and"] in the input sentence is simply associated with the operator "AND", or a negative meaning in the search word such as "華々しくない" ["not brilliant"] is not reflected on the search sentence. On the other hand, in the present invention, a word corresponding to the operator and target words relating to the word are determined from words decomposed into plural words by input analysis as described above, and determination of the operator itself is made in consideration of relating target words, as a result, the true intention and the nuance of the input sentence is correctly reflected on the search sentence.

Next, in Step S34, a frame of the search sentence is decided from the analysis result of the input sentence obtained in Step S32 and the operator determined in Step S33. The frame of the search sentence defines an outline of the search sentence, which is configured by arrangement of brackets (in order of evaluation in the search expression) in the search sentence, an operator, and variables (target words are arranged later).

Next, in step S35, corresponding target words are arranged at positions of variables included in the frame of the search sentence and variables are replaced by the target words to thereby generate a final search sentence based on the analysis result of the input sentence obtained in Step S32.

Next, the generated search sentence is transmitted to the information providing server 200 in Step S36.

As described above, the received input sentence is analyzed to determine the word corresponding to the operator and to decide the frame of the search sentence, then, parts of variables in the frame of the search sentence are replaced by the target words to complete the final search sentence in the search sentence generation server 300 according to the first embodiment. According to the search sentence generation method, the search sentence on which the true intention and the nuance of the search included in the natural sentence are reflected can be generated based on the natural sentence inputted by the user.

A more specific method concerning the generation of the search sentence in the search sentence generation server 300 according to the first embodiment will be explained in detail later with reference to FIG. 5.

Figure 4:
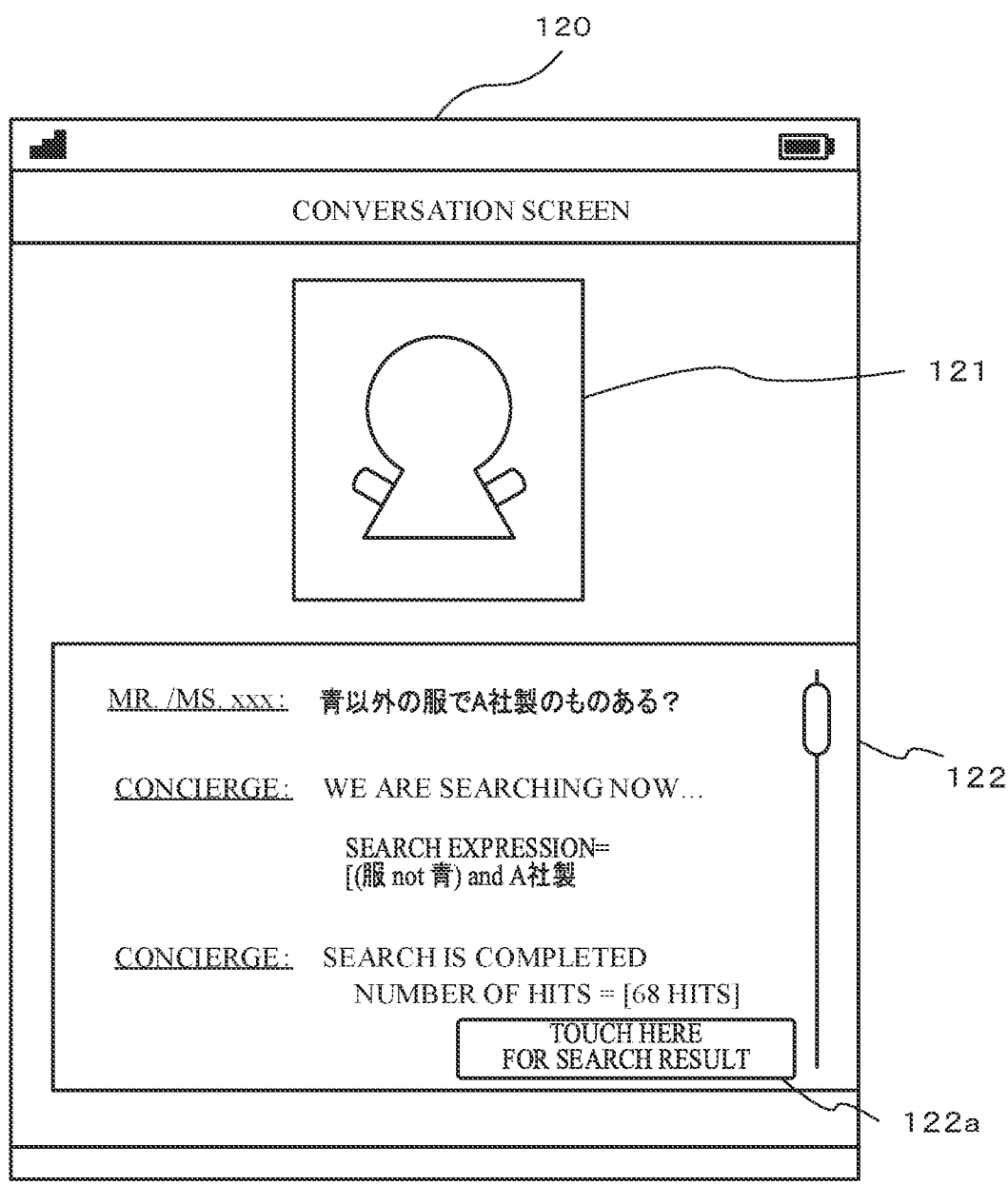
FIG. 4 is a view illustrating a graphical user interface of a conversation screen on a user terminal in the information providing system of FIG. 1.

FIG. 4 shows an example of a graphical user interface (GUI) of a conversation screen 120 displayed on a display of the user terminal 100. On the conversation screen 120, a mascot display part 121 and an input response display part 122 are shown. On the mascot display part 121, a mascot as a concierge changing expression and motion so as to correspond to the display of the input of the input sentence by the user 10 or the search result is displayed. On the input response display part 122, the input sentence as the natural sentence inputted in the user terminal 100 by the user 10 is displayed.

Moreover, on the input response display part 122, a message indicating that the search is performed based on the input sentence and the search sentence generated based in the input sentence are displayed as a response of the concierge. After that, a search result corresponding to the input sentence transmitted from the information providing system 1 is displayed below the above message as a response of the concierge.

Also as shown in FIG. 4, the number of hits and a link button 122a for displaying detailed information of the search result are shown as the search result from the information providing system 1. For example, when the user 10 presses (or touches) the link button 122a, the display on the user terminal 100 makes transition to another WEB page displaying detailed information of the search result. On this WEB page, for example, a list of items satisfying conditions of the search sentence and link information to data indicating the details of respective items are displayed.

A and B of FIG. 5 are views for explaining the search sentence generation processing executed in the search sentence generation server 300 according to the first embodiment in more detail by using an input sentence 350 as an example.

As shown in FIG. 5A, the search sentence generation server 300 receives the input sentence 350 saying "青以外の服でS社製" ["clothes other than blue and manufactured by S company"] from the user 10 and executes morphological analysis to the input sentence 350 (see S32 of FIG. 3). A result of morphological analysis is shown as an analysis result 351 in FIG. 5A.

The input sentence 350 is decomposed inti respective words of, for example, "青" ["blue"], "以外" ["other"], "の" ["of" or "than"], "服" ["clothes"], "で" ["and"], "S社" ["Company S"], "製" ["manufactured by"] by morphological analysis. Here, for example, the words of "青", "以外", "服", "S社" are respectively determined as nouns [or as an adjective that modifies a noun in the case of "blue" in English], the words of "の", "で" are determined to be particles (case particles), and the words of "製" are determined to be a suffix [or as a morpheme that expresses a subject/object relationship in the case of English]. Note that the word "S社" ["S-company"] is determined as a noun representing a company name according to a proper noun dictionary included in the data for analysis 340.

Next, determination about the word corresponding to the operator and the target words is made (refer to Step S33 of FIG. 3). First, "以外" ["other"] as the noun and "の" ["than"] as the particle [together corresponding to the adjective phase "other than" in English] are extracted from the analysis result 351, and these two words are determined to correspond to an operator "NOT" when being coupled together (for example, by referring to the data for analysis 340). When the natural sentence is "Q2 other than P2", the search expression is configured as "Q2 NOT P2" (a sign 353 in FIG. 5A). In such configuration, Q2 and P2 are determined as target words relating to the word "以外の" ["other than"]. In this example, Q2 is a noun and P2 is a noun or an adjective modifying Q2.

Next, "で" ["and"] as the particle is extracted from the analysis result 351, and this word corresponds to "AND". When the natural sentence is "P1 で Q1" ["P1 and Q1"], the search expression is configured as "P1 AND Q1 (a sign 352 in FIG. 5A). In such configuration, Q1 and P1 are determined as target words relating to the word "で" [translating as "and" in English]. In this example, Q1 is a noun and P1 is an adjectival expression, which has a parallel relationship connected by "AND".

Accordingly, the search expressions "Q2 NOT P2" and "P1 AND Q1" are extracted by determination of the operators and the target words from the analysis result 351. A frame 354 of the search sentence is determined as "(Y NOT X) AND Z" by integrating these two search expressions (refer to Step S34 of FIG. 3). In this case, "P1" and "Q2" correspond to the same noun "服" ["clothes"], and "Q2" is further modified by "P2" and the operator "NOT" from an arrangement relation and the contents of the words corresponding to the operators ("以外の" ["other than"] and "で" ["and"]) and the target words adjacent to (for example, before and after) the words.

As a result, "P1" is associated with "Q2 NOT P2"; therefore, the frame 354 of the search sentence will be, first, "(Q2 NOT P2) AND Q1". Here, the search expression "Q2 NOT P2" is incorporated with brackets as "P1" is associated with "Q2 NOT P2", and a logical operation inside the brackets takes a priority in a search sentence to be finally generated. It is not always necessary that the logical operation is executed first though the priority of logical operation is high. That is because there is a possibility that the search sentence is developed into another search expression having the same meaning in a search engine interpreting the search sentence.

After that, the above "(Y NOT X) AND Z" is determined by replacement of Q2=Y, P2=X, and Q1=Z (the replacement by X, Y, Z is simply for making explanation easy to understand).

Next, as shown in FIG. 5B, X="青" ["blue"], Y="服" ["clothes"], and Z="S社製" ["manufactured by S-company"] when the above X, Y and Z are replaced based on the analysis result 351, and the search sentence 355 finally generated will be "(服 NOT 青) AND S社製" ["(clothes NOT blue) AND manufactured by S-company"].

"青" ["Blue"] which is the noun [classified as an adjective that modifies a noun in the case of "blue" in English] decomposed in the analysis result 351 (obtained by using, for example, a synonym dictionary or the like included in the data for analysis 340) can be converted into "青い" ["bluish"] as a attributive form of the corresponding adjective. Also in this case, "S社製" ["manufactured by S-company"] which is an adjectival expression made by coupling the noun "S社" ["S-company"] with the suffix "製" ["manufactured by"] which are decomposed in the analysis result 351 is associated with the above "Z"; however, it is also preferable that the noun "S社" ["S-company"] is associated with "Z".

According to the above search sentence generation processing, a search sentence 355 which says "(服 NOT 青) AND S社製" [(clothes NOT blue) AND manufactured by S-company"] is generated based on the input sentence relating to the search which says "青以外の服でS社製" ["Clothes other than blue and manufactured by S-company"] inputted by the user 10.

According to the configuration of the present invention, a specific character string in the input sentence is not simply associated with an operator, and the true intention and the nuance of the input sentence can be correctly extracted and reflected on the search sentence.

FIG. 6 collectively shows various cases concerning the search sentence generation processing explained with reference to FIG. 5. The operator and target words are determined based on a word determined in the input sentence and words adjacent to the word, and the search sentence is finally generated. However, the search sentence generation processing according to the present invention is not limited to cases enumerated here.

An example of Case 1 relates to the operator of the logical operation "NOT", and this operator indicates "negative". In a case where an example of the input sentence is "苦くない薬" ["non-bitter medicine"], "苦く" [a word "bitter"] as a target word is determined as an adjective ("連用形"), a word "ない" ["non" or "lacking" or "absent"] is determined as an adjective (auxiliary adjective) and a word "薬" ["medicine"] as a target word is determined as a noun by morphological analysis. Here, the word corresponding to the operator is "ない" ["non" or "lacking" or "absent"]. In this case, the word "ない" ["non" or "lacking" or "absent"] is determined to have a meaning that negates the adjective "苦く" ["bitter"], and the word is determined to correspond to the operator "NOT". After that, "薬" ["medicine"] and the "苦い" as the final form of the adjective "苦く" ["bitter"] are selected as target words, and a search sentence "薬 NOT 苦い" ["medicine NOT bitter"] is generated.

An example of Case 3 relates to an operator of a logical operation "OR", and this operator indicates "logical sum". In a case where an example of the input sentence is "赤いもしくは青い服" ["red or blue clothes"], a word "赤い" ["red"] as a target word is determined as an adjective, a word "もしくは" ["or"] is determined as a conjunction, and a word "青い" ["blue"] as a target word is determined as an adjective by morphological analysis. Here, the word corresponding to the operator is "もしくは" ["or"]. In this case, the word "もしくは" ["or"] is determined to indicate the logical sum as described above, and the word is determined to correspond to the operator "OR".

Here, for example, when partial search sentences "赤い OR" ["red OR"], "OR 青い" ["OR blue"], and "青い AND 服" ["blue AND clothes"] are generated, these partial search sentences are integrated to generate a final search sentence (note that target words in an input sentence "青い服" ["blue clothes"] are "青い" ["blue"] and "服" ["clothes"], and a word corresponding to the operator will be "青い" ["blue"] which modifies "服" ["clothes"].) In the above partial search sentence "青い AND 服" ["blue AND clothes"], the target word "服" ["clothes"] is modified by the operator "AND" and the target word "青い" ["blue"]. When this partial sentence is integrated into a search sentence "赤い OR 青い" ["red OR blue"] formed by coupling the partial search sentences "赤い OR" ["red OR"] and "OR 青い" ["OR blue"], "赤い OR 青い" ["red OR blue"] is incorporated with brackets so as to take a priority in the logical operation. The use of brackets in the search sentence is determined from, namely, arrangement relation and the contents of the word corresponding to the operator and target words adjacent to the word.

Examples of Cases 2, 4 to 6 also relate to operators of the logical operations, and the search sentences are constructed based on the word correspond to the operator included in the input sentence in the same manner as Case 1. The detailed explanation is omitted here.

An example of Case 7 relates to an operator of a comparison operation "=", and the operator indicates "equal". For example, in a case where the input sentence is "価格が1万円" ["price is ten thousand yen"], a word corresponding to the operator is "が" ["is"] which is a particle (case particle) [verb indicating present tense of be].

In this case, the input sentence is decomposed into "価格" ["price"], "が" ["is"], "1万" ["ten thousand"], and "yen" by morphological analysis, and a word "価格" ["price"] and a word "1万" ["ten thousand"] indicating a quantity (in this case, numerals and numbers representing units are combined) are arranged adjacent to the word "が" ["is"] corresponding to the operator; therefore, the word "が" ["is"] is determined as a word corresponding to an operator "=". After that, "価格" ["price"] is converted into "price" and "1万" ["ten thousand"] is converted into "10000", then, these words are selected as target words to generate a search sentence "price=10000".

Examples of Case 7 to 12 also relate to operators of comparison operations, and search sentences are constructed based on the word corresponding to the operator included in the input sentence in the same manner as Case 6. The detailed explanation is omitted here.

It is also possible to perform the search by combining plural logical operations with each other or plural comparison operations with each other. For example, when the input sentence is "苦くない 錠剤の薬" ["non-bitter tablet medicine"], the search sentence can be generated to be "薬 AND 錠剤 NOT 苦い" ["medicine AND tablet NOT bitter"].

It is further possible to perform search by combining plural logical operations and comparison operations. For example, when the input sentence is "価格が１万円以下の赤い服" ["red clothes in value equal to or less than ten thousand yen"], the search sentence can be generated to be "服 AND 赤い AND 価格 <=10000" ["clothes AND red AND value <=10000"].

Figure 7:
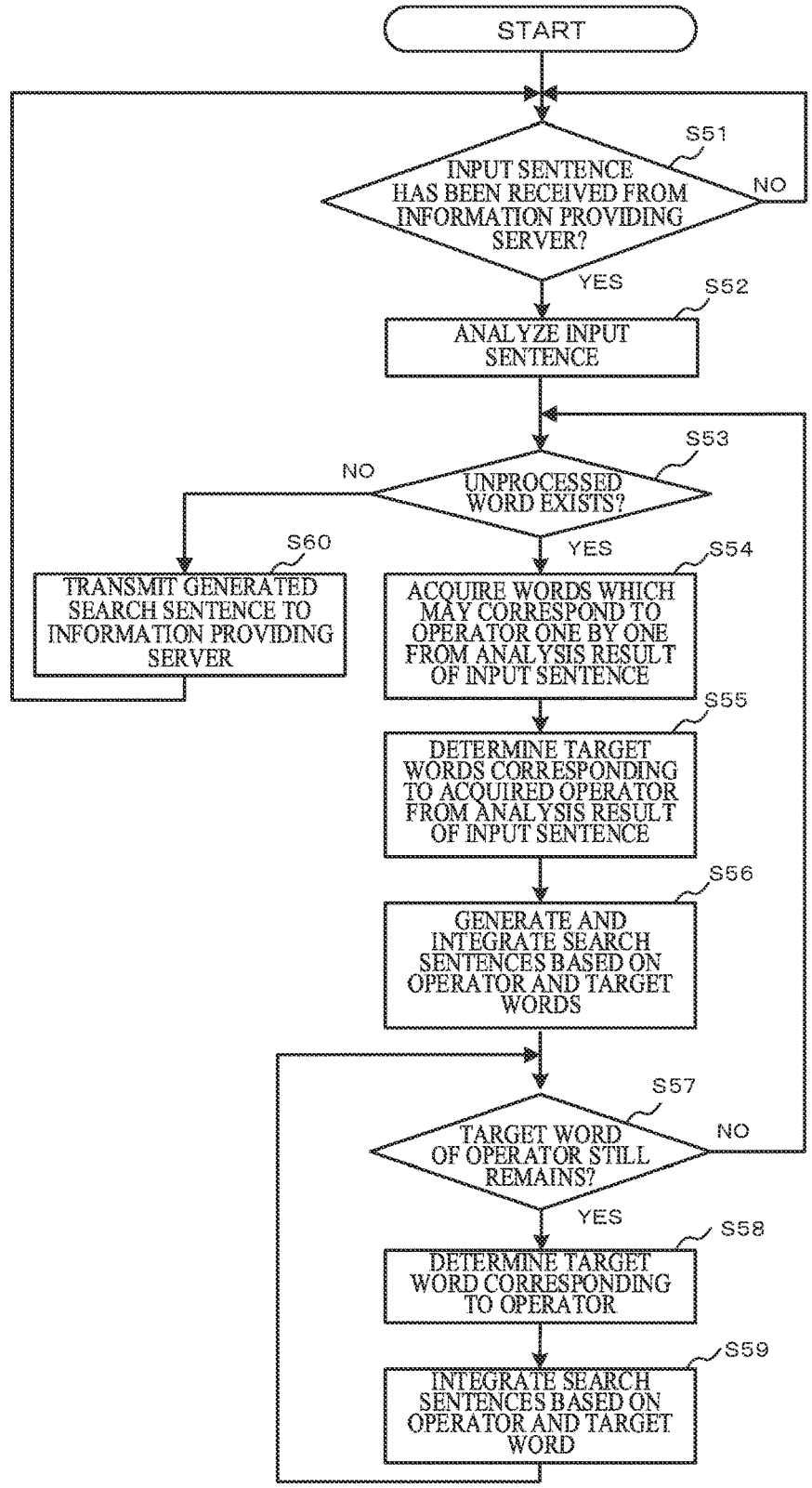
FIG. 7 is a flowchart illustrating search sentence generation processing of a search sentence generation server according to a second embodiment of the present invention.

FIG. 7 is a flowchart showing the flow of search sentence generation processing executed in a search sentence generation server 300' according to a second embodiment of the present invention. The search sentence generation server 300' can be arranged instead of the search sentence generation server 300 according to the first embodiment of the present invention in the information providing system 1 shown in FIG. 1.

The search sentence generation processing executed in the search sentence generation server 300' generates a search sentence in accordance with prescribed rules based on an input sentence when receiving the input sentence of the user 10 from the information providing server 200 and transmits the generated search sentence to the information providing server 200 in the same manner as the search sentence generation processing by the search sentence generation server 300.

First, the search sentence generation server 300' determines whether the input sentence of the user 10 has been received from the information providing server 200 or not in Step S51. When the input sentence has not been received (NO in Step S51), the determination processing is repeated. When the input sentence has been received (YES in Step S51), the process proceeds to Step S52.

In Step S52, the search sentence generation server 300' analyzes the received input sentence and extracts plural words from the input sentence. In the embodiment, morphological analysis is performed by using the morphological database included in the data for analysis 340. According to the analysis, the input sentence is decomposed into minimum units (morphemes) having meanings. For example, respective words are extracted (decomposed) by being classified into parts of speech such as a noun, a verb, a particle, an auxiliary verb, and an adjective. Although the morphological analysis is performed in the embodiment, the input sentence may be analyzed in various methods such as analysis in which collation with a given keyword is performed, and analysis in which comparison with words registered in a dictionary is performed, thereby extracting plural words.

Additionally, words not directly relating to a construction of the search sentence to be generated are deleted or adjusted at this time in the same manner as in the case of the search sentence generation server 300. The nouns and adjectives are converted into forms (styles) suitable for being used in the search sentence according to need.

Next, whether an unprocessed word (word corresponding to an operator) exists in the analysis result (decomposed words) of the input sentence is determined in Step S53. When there does not exist an unprocessed word (NO in Step S53), the generation of the search expression is completed; therefore, the generated search sentence is transmitted to the information providing server 200 in Step S60 and the processing of Step S51 (the processing of determining whether the input sentence of the user 10 has been received from the information providing server 200 or not) is repeated.

When there exists an unprocessed word (YES in Step S53), words which may correspond to an operator included in the search sentence are determined one by one from the analysis result (decomposed words) of the input sentence in Step S54. For example, when successive morphemes such as "以外" ["other"] "の" ["than"] are extracted from part of the input sentence, a word "以外の" ["other than"] obtained by coupling the two words is determined to correspond to a logical operation NOT also in consideration of adjacent target words including nouns and so on. Moreover, when a morpheme such as "で" ["and"] is extracted from part of the input sentence, the word "で" ["and"] is determined to correspond to a logical operation AND also in consideration of adjacent target words including nouns and so on.

Moreover, the word corresponding to the operator is determined by referring to the data for analysis 340 according to need and determining whether an adjective is in a negative form or not, and consequently, NOT may be put into the search sentence, or to which operator of the logical operation the word corresponds can be determined according to kinds of target words adjacent to the word in the embodiment.

Next, in Step S55, target words corresponding to the operator are determined based on the analysis result of the input sentence in Step S52 and one operator determined in Step S54. Here, the target words are a noun, an adjective and so on adjacent to the word determined to correspond to the operator, which corresponds to search target items or search values in the search target data 400 in the search sentence.

Next, in Step S56, the search sentences are generated and integrated based on one operator determined in Step S54 and the target words determined in Step S55. Step S54 to Step S56 are repeated while an unprocessed word (word which may correspond to the operator) exists in the analysis result (decomposed words) in the input sentence; therefore, the search sentence is sequentially integrated with the generated search sentence every time a word corresponding to the operator appears.

Next, in Step S57, whether a target word relating to one operator determined in Step S54 remains or not is determined. When there does not exist a target word (NO in Step S57), the process returns to Step S53, where whether an unprocessed word (word which may correspond to the operator) still exists in the analysis result (decomposed words) of the input sentence or not is determined.

When there is a target word (YES in Step S57), in Step S58, the target word corresponding to the operator is determined from the analysis result of the input sentence in Step S52 and one operator determined in Step S54. Next, the search sentences are integrated in Step S59 based on one operator determined in Step S54 and the target word determined in Step S58. After Step S58, the process returns to Step S57, where whether a target word relating to one operator determined in Step S54 remains or not is determined.

As described above, the received input sentence is analyzed and words which may correspond to the operator are determined one by one, and the search sentence is constructed based on the operator and the target word every time the target word of the operator is determined in the search sentence generation server 300' according to the second embodiment. This processing is repeated for all words corresponding to the operators, thereby completing the final search sentence. According to the search sentence generation method, the search sentence on which the true intention or the nuance of the search included in the natural sentence is reflected can be generated based on the natural sentence inputted by the user.

A and B of FIG. 8 are views for explaining the search sentence generation processing executed in the search sentence generation server "300' according to the second embodiment in more detail by using an input sentence 360 as an example.

Figure 8A:
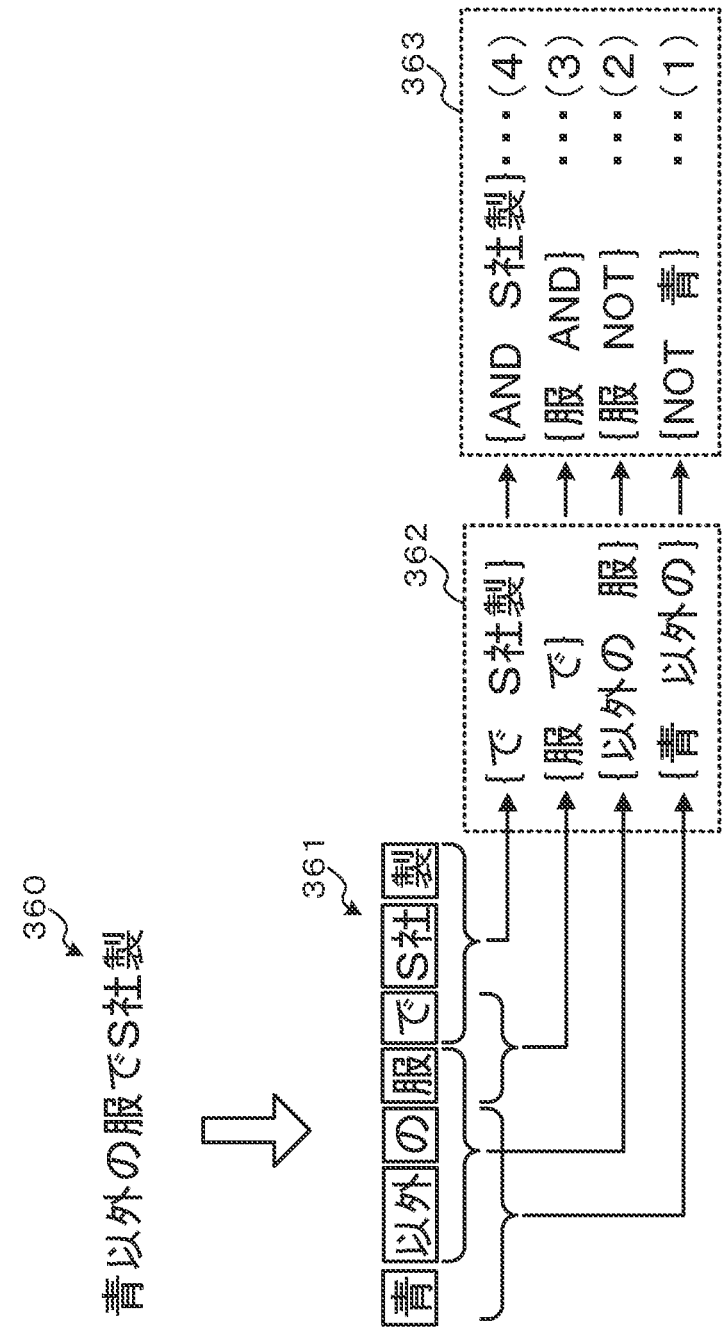
FIGS. 8A and 8B are views illustrating an outline of search sentence generation processing of the search sentence generation server according to the second embodiment of the present invention.

As shown in FIG. 8A, the search sentence generation server 300' receives the input sentence 360 saying "青以外の服でS社製" ["clothes other than blue and manufactured by S-company"] from the user 10, and morphological analysis is performed to the input sentence 360 (refer to Step S52 of FIG. 7). In FIG. 8A, the result of morphological analysis is shown as an analysis result 361.

The input sentence 360 is decomposed into respective words of, for example, "青" ["blue"], "以外" ["other"], "の" ["than"], "服" ["clothes"], "で" ["and"], "S社" ["S Company"], and "製" ["manufactured by"]. Here, for example, the words of "青" ["blue"], "以外" ["other"], "服" ["clothes"], and "S社" ["S-company"] are respectively determined as nouns [or as an adjective that modifies a noun in the case of "blue" in English], the words of "の" ["than"] and "で" ["and"] are determined as particles (case particles), and the words of "製" ["manufactured by"] are determined as a suffix phrase [or as a morpheme that expresses a subject/object relationship in the case of English]. Note that the word "S社" ["S-company"] is determined as a noun representing a company name according to a proper noun dictionary included in the data for analysis 340.

Here, a first word to be an operator of the search sentence is determined and acquired (refer to Step S54 of FIG. 7). First, "以外" ["other"] as the noun and "の" ["than"] as the particle are extracted from the analysis result 361, and these two words are determined to correspond to an operator "NOT" when being coupled together (for example, by referring to the data for analysis 340). Next, target words correspond to the operator "NOT", namely, words adjacent to (for example, before and after) the words "以外の" ["other than"] are acquired from the analysis result 361 to be determined as target words (refer to Step S55 of FIG. 7).

After the processing, "以外の" ["other than"] corresponding to the operator "NOT" and a target word "青" ["blue"] corresponding to the word "以外の" ["other than"] are determined, and a set of words "青 以外の" ["other than blue"] is shown in a determination result 362 of FIG. 8A. A search sentence "NOT 青" ["NOT blue"] is generated based on the set of words "青 以外の" ["other than blue"] (refer to Step S56 of FIG. 7), and the search sentence is shown as (1) in a partial search sentence 363 of FIG. 8A.

After that, whether a target word corresponding to the word "以外の" ["other than"] remains or not is determined (refer to Step S57 of FIG. 7). As a result, a target word "服" ["clothes"] is determined, and a set of words "以外の 服" ["clothes other than"] is shown in the determination result 362 of FIG. 8A. Furthermore, a search sentence "服 NOT" ["clothes NOT"] is generated based on the set of words "以外の 服" ["clothes other than"] (refer to Step S56 of FIG. 7), and the search sentence is shown as (2) in the partial search sentence 363 of FIG. 8A.

Figure 8B:
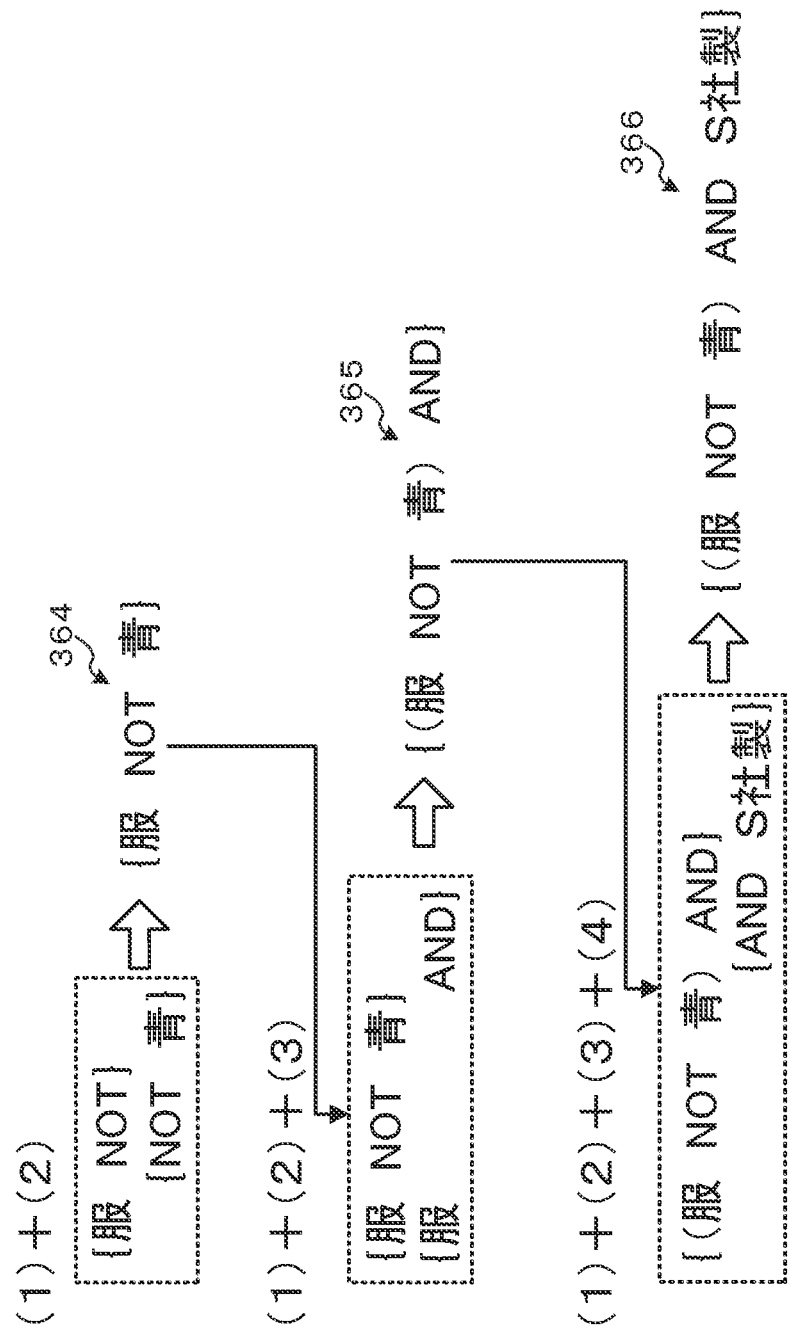

Here, (1) and (2) in the partial search sentence 363 are integrated as shown in FIG. 8B (refer to Step S56 of FIG. 7) to generate "服 NOT 青" ["clothes NOT blue"] as a search sentence 364.

After that, whether a target word corresponding to the word "以外の" ["other than"] remains or not is determined (refer to Step S57 of FIG. 7). As a result, the target word does not exist; therefore, a next word to be the operator of the search sentence is determined and acquired (refer to Step S54 of FIG. 7). Here, "で" ["and"] as a particle is extracted from the analysis result 361, and the word "で" ["and"] corresponds to the operator "AND". Next, a target word corresponding to the operator "AND", namely, the word adjacent to the word "で" ["and"] is acquired from the analysis result 361 to be determined as the target word (refer to Step S55 of FIG. 7).

As a result of the processing, the word "で" ["and"] corresponding to the operator "AND" and the target word "服" ["clothes"] corresponding to the word "で" ["and"] are determined, and a set of words "服 で" ["clothes and"] is shown in the determination result 362 of FIG. 8A. Moreover, a search sentence "服 AND" ["clothes AND"] is generated based on the set of words "服 で" ["clothes and"] (refer to Step S56 of FIG. 7), and the search sentence is shown as (3) in the partial search sentence 363 of FIG. 8A.

Here, (1), (2), and (3) in the partial search sentence 363 are further integrated as shown in FIG. 8B (refer to Step S56 of FIG. 7) to generate "(服 NOT 青) AND" ["(clothes NOT blue) AND"] as a search sentence 365. The integration processing is performed by integrating the search sentence 364 shown in FIG. 8B with the (3) of the partial search sentence 363 shown in FIG. 8A and simplifying the sentences by parts of the common target word "服" ["clothes"]. Here, in "服 NOT 青" ["clothes NOT blue"] as the search sentence 364, the target word "服" ["clothes"] is modified by the operator "NOT" and the target word "青" ["blue"]. When the search sentence is integrated with the search sentence "服 AND" ["clothes AND"] as the partial search sentence, "服 NOT 青" ["clothes NOT blue"] is incorporated with brackets so as to take a priority in the logical operation as described above. The use of brackets in the search sentence is determined from arrangement relation and the contents of the word corresponding to the operator and the target words adjacent to the word.

After that, whether a target word corresponding to the word "で" ["and"] remains or not is determined (refer to Step S57 of FIG. 7). As a result, the target word "S社" ["S-company"] and "製" ["manufactured by"] are determined, and a set of words "で S社製" ["and manufactured by S-company"] is shown in the determination result 362 of FIG. 8A. Although "S社" ["S-company"] and "製" ["manufactured by"] are respectively extracted as morphemes in the analysis result 361 in the embodiment, "S社" ["S-company"] and "製" ["manufactured by"] are integrated to make "S社製" ["manufactured by S-company"] for making the target words adjectival expression. Naturally, only "S社" ["S-company"] which is a noun can be selected as the target word.

Furthermore, a search sentence "AND S社製" ["AND manufactured by S-company"] is generated based on a set of words "で S社製" ["and manufactured by S-company"]

(refer to Step S56 of FIG. 7), and the search sentence is shown as (4) in the partial search sentence 363 of FIG. 8A.

Here, (1) to (4) in the partial search sentence 363 are integrated as shown in FIG. 8B (refer to Step S56 of FIG. 7) to generate "(服 NOT 青) AND S 社製" ["(clothes NOT blue) AND manufactured by S-company"] as a search sentence 366. The integration processing is performed by integrating the search sentence 365 shown in FIG. 8B with (4) in the partial search sentence 363 shown in FIG. 8A and simplifying the sentences by parts of the common operator "AND".

After that, whether a target word corresponding to the word "で" ["and"] remains or not is determined (refer to Step S57 of FIG. 7). As a result, the target word does not exist; therefore, a next word to be the operator of the search sentence is determined and acquired (refer to Step S54 of FIG. 7). Here, there does not exist an unprocessed word corresponding to the operator from the analysis result 361; therefore, the search sentence 366 "(服 NOT 青) AND S 社製" ["(clothes NOT blue) AND manufactured by S-Company"] generated by the above integrated processing is transmitted to the information providing server 200 as the generated search sentence (refer to Step S60 of FIG. 7).

In the search sentence generation processing executed in the search sentence generation server 300' according to the second embodiment of the present invention, analysis of the entire input sentence is performed at a time (Step S52 of FIG. 7), then, search sentence generation processing is sequentially performed concerning each word corresponding to the operator one by one (Step S53 to Step S59 of FIG. 7) as show in FIG. 7 and FIG. 8. It is also possible to perform control so as to execute search sentence generation processing concerning the word every time the word corresponding to the operator is extracted while performing analysis of the input sentence partially.

Figure 9:
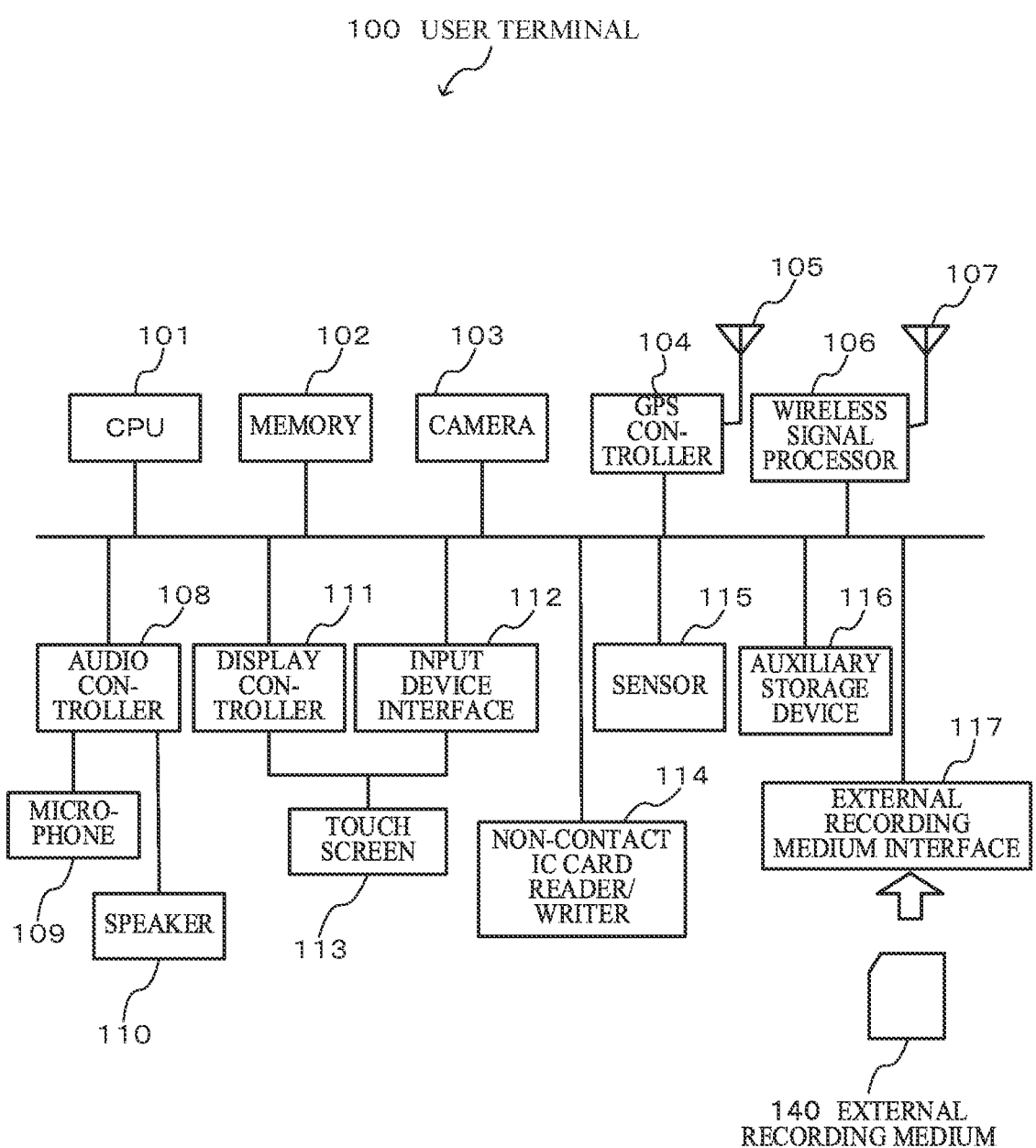
FIG. 9 is a diagram showing an example of a hardware configuration of a computer forming the user terminal relating to the information providing system according to the present invention.

Next, an example of a hardware configuration of a computer forming the user terminal 100 according to the embodiment of the present invention will be explained with reference to FIG. 9. The user terminal 100 is, for example, a portable device such as a smart phone. A configuration of the user terminal 100 shown in FIG. 9 is a typical configuration as an example.

The user terminal 100 includes a CPU (Central Processing Unit) 101, a memory 102, a camera 103, a GPS controller 104, a GPS antenna 105, a wireless signal processor 106, a wireless communication antenna 107, an audio controller 108, a microphone 109, a speaker 110, a display controller 111, an input device interface 112, a touch screen 113, a non-contact IC card reader/writer 114, a sensor 115, an auxiliary storage device 116, and an external recording medium interface 117.

The CPU 101 controls operations of respective components of the user terminal 100 to execute respective functions under control of OS.

The memory 102 is normally configured by a RAM (Random Access memory). Programs for realizing respective functions executed in the CPU 101 are loaded to the memory 102 at the time of execution, and data and so on necessary for the programs is temporarily stored.

The camera 103 is a small-sized imaging device incorporated in the user terminal 100. The GPS controller 104 receives signals from plural GPSs through the GPS antenna 105 to check a position of the user terminal 100.

The wireless signal processor 106 performs communication with a cell-phone base station through the wireless communication antenna 107, controlling transmission/reception of call data with respect to other devices and transmission/reception of WEB pages and mail data with respect to other terminals (through Internet). The wireless signal processor 106 also realizes communication with respect to a wireless LAN access point by wireless LAN using the wireless communication antenna 107 to perform data transmission/reception through Internet (in this case, the wireless communication processor 106 and the wireless communication antenna 107 perform wireless communication between the terminal and the cell-phone base station and wireless communication between the terminal and the wireless LAN access point for convenience.)

The audio controller 108 realizes a call by wireless communication by controlling the microphone 109 and the speaker 110, and on the other hand, controls output of audio when reproducing movies or music on applications.

The touch screen 113 displays information on a display device configured by, for example, an LCD (Liquid Crystal Display) or the like and detects a position touched (pressed) by the user with a finger on a screen surface by a resistive-film type touch sensor or a capacitive type touch sensor. The display controller 111 processes drawing data issued by the CPU 101 and outputs, for example, a WEB page, video and the like on the display device of the touch screen 113. When the touch sensor of the touch screen 113 detects an operation by the user, the input device interface 112 transmits the operation as a prescribed signal to the CPU 101.

When a card in which a non-contact IC chip is embedded is held over a prescribed position of the user terminal 100, the non-contact IC card reader/writer 114 reads data stored in the IC chip or writes a prescribed data on the IC chip based on an instruction of the CPU 101.

The sensor 115 is a sensor other than the touch sensor of the touch screen 113, which is a motion sensor, an optical sensor, or a proximity sensor.

The auxiliary storage device 116 is configured by a semiconductor memory called a flash memory or a hard disc. The auxiliary storage device 116 stores programs for realizing respective functions executed in the CPU 101 and stores various data.

The external recording medium interface 117 accesses an external recording medium 140 and reads the data recorded therein. The external recording medium 140 is, for example, a portable flash memory.

Figure 10:
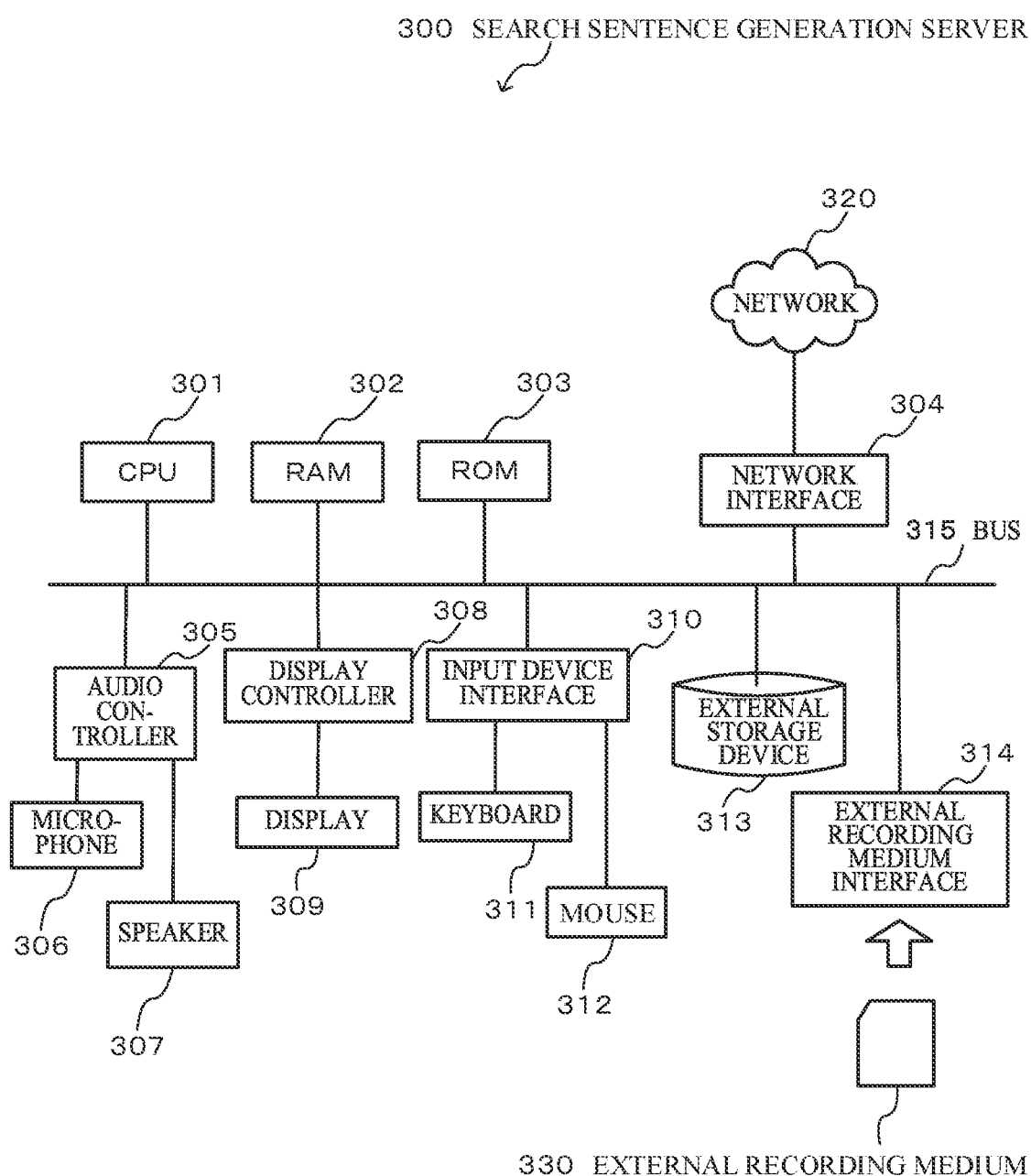
FIG. 10 is a diagram showing an example of a hardware configuration of a computer forming the search sentence generation server included in the search sentence generation system according to the present invention.

Next, an example of a hardware configuration of a computer forming the search sentence generation server 300 according to the first embodiment of the present invention will be explained with reference to FIG. 10. A configuration of the search sentence generation server 300 shown in FIG. 10 is a typical configuration as an example. The configuration of the computer may be adopted as configurations of the search sentence generation server 300' according to the second embodiment of the present invention, the information providing server 200 of the information providing system 1 and the like.

The search sentence generation server 300 includes a CPU 301, a RAM 302, a ROM (Read Only Memory) 303, a network interface 304, an audio controller 305, a microphone 306, a speaker 307, a display controller 308, a display 309, an input device interface 310, a keyboard 311, a mouse 312, an external storage device 313, an external recording medium interface 314, and a bus 315 connecting these components to one another.

The CPU 301 controls operations of respective components of the search sentence generation server 300 and controls execution of respective functions according to the present invention under control of OS.

In the RAM 302, programs for executing respective processing executed in the CPU 301 or data used during execution of these programs are temporarily stored. In the ROM 303, a program executed at the time of activating the search sentence generation server 300 and the like are stored.

The network interface 304 is an interface for connecting to a network 320. The network 320 is a network, for example, for connecting to the information providing server 200.

The audio controller 305 controls input/output of audio by controlling the microphone 306 and the speaker 307. The display controller 308 is a dedicated controller for actually processing a drawing instruction issued by the CPU 301. The display 309 is, for example, a display device configured by the LCD.

The input device interface 310 receives signals inputted from the keyboard 311 or the mouse 312 and transmits a prescribed instruction to the CPU 301 in accordance with a signal pattern.

The external storage device 313 is a storage device such as a hard disc or a semiconductor memory, and the above programs and data are recorded in the device.

The external recording medium interface 314 accesses the external recording medium 330 to read data recorded therein. The external recording medium 330 is, for example, a portable flash memory or the like. The programs executed in the CPU 301 and for realizing respective functions of the present invention may be provided from the external recording medium 330 through the external recording medium interface 314. As another distribution route for the programs for realizing respective functions of the present invention, a route in which the programs are stored from a prescribed server on the network to the external storage device 313 or the RAM 302 through the network 320 and the network interface 304, and other routes can be considered.

The search sentence generation system 11 including the search sentence generation server 300 according to the first embodiment of the present invention or the search sentence generation server 300' according to the second embodiment of the present invention, and the information providing system 1 including the search sentence generation system 11 have been explained while showing specific examples capable of achieving the present invention; however, these specific examples are just examples for explaining the present invention, and the scope of right in the present invention is not limited to these specific examples. The technical idea of the present invention can be realized by various methods and configuration other than the above specific examples.

REFERENCE SIGNS LIST

1: information providing system
11: search sentence generation system
100: user terminal
200: information providing server
300: search sentence generation server
300': search sentence generation server
340: data for analysis
400: search target data
500: network

The invention claimed is:

1. A logical search sentence generation system configured to transform a natural-language search query, inputted to an Internet-based web browser on a user terminal, into a logical search sentence that is useable to conduct an Internet search, the search sentence generation system comprising:
   an input sentence-receiving server that is programmed to receive from the user terminal, while the Internet-based web browser is being implemented on the user terminal, the natural-language search query in the form of a natural sentence without database-specific formatting or arrangement of search terms;
   an input sentence-analysis server that is programmed to perform morphological analysis of the natural-language search query and to decompose the natural-language search query into a plurality of morphemes, the morphemes comprising minimum grammatical units having linguistic meaning and including whole words and grammatical or linguistic elements that are shorter than whole words;
   a determination server programmed to repeatedly determine a word corresponding to a relational operator based on the plurality of morphemes and to determine a target word relating to the determined word via the corresponding relational operator, thereby yielding a set of determined words and target words and their associated relational operators; and
   a search sentence-generation server programmed to generate the logical search sentence corresponding to the inputted natural-language search query by using the set of determined words and target words and their associated relational operators, the generated logical search sentence being useable for an Internet-based search;
   wherein the search sentence-generation server is programmed to generate the logical search sentence so that priority of a logical operation by a given relational operator is determined based on relationship between the given relational operator and the respectively associated target words in respective sets of the relational operators corresponding to the determined words and the corresponding target words determined to relate to the words:
   wherein the determination server is programmed to determine the words which may correspond to the operator one-by-one concerning the plural words; and
   wherein the search sentence-generation server is programmed to iteratively generate an interim logical search sentence concerning the determined word every time the word corresponding to the operator is determined and to integrate the interim logical search sentence with a preceding interim logical search sentence that has already been generated until all determined words have been processed, thereby yielding a final search sentence.

2. The logical search sentence generation system according to claim 1, wherein the determination server is programmed to determine a word corresponding to an operator of a negative logical operation based on a predetermined determination standard.

3. A logical search sentence-generating method configured to transform a natural-language search query, inputted to an Internet-based web browser on a user terminal, into a logical search sentence that is useable to conduct an Internet search, the logical search sentence-generating method comprising:
   receiving from the user terminal running the Internet-based web browser the natural-language search query in the form of a natural sentence without database-specific formatting or arrangement of search terms;
   performing morphological analysis of the natural-language search query and decomposing the natural-language search query into a plurality of morphemes, the morphemes comprising minimum grammatical units having linguistic meaning and including whole words and grammatical or linguistic elements that are shorter than whole words;

repeatedly determining a word corresponding to a relational operator based on the plurality of morphemes and determining a target word relating to the determined word via the corresponding relational operator, thereby yielding a set of determined words and target words and their associated relational operators; and generating the logical search sentence corresponding to the inputted natural-language search query by using the set of determined words and target words and their associated relational operators, the generated logical search sentence being useable for an Internet-based search;

wherein the logical search sentence is generated so that priority of a logical operation by a given relational operator is determined based on relationship between the given relational operator and the respectively associated target words in respective sets of the relational operators corresponding to the determined words and the corresponding target words determined to relate to the words;

wherein the words which may correspond to the operator are determined one-by-one concerning the plural words; and wherein an interim logical search sentence concerning the determined word is iteratively generated every time the word corresponding to the operator is determined and the interim logical search sentence is integrated with a preceding interim logical search sentence that has already been generated until all determined words have been processed, thereby yielding a final search sentence.

4. The logical search sentence-generating method of claim 3, further comprising causing the logical search sentence that is generated to be displayed at the user terminal.

5. A search sentence generation server system, comprising:

an input sentence-receiving server, including computer memory, programmed to receive an input sentence of a natural sentence inputted by a user;

an input sentence-analysis server, including computer memory, configured to analyze the input sentence and to decompose the input sentence into plural words;

a determination server configured to determine a word corresponding to an operator based on the plural words and to determine a target word relating to the determined word; and a search sentence-generation server configured to generate a search sentence corresponding to the input sentence by using a set of the operator corresponding to the determined word and the target words determined to relate to the word, wherein the search sentence-generation server is configured to generate the search sentence so that priority of a logical operation by a given operator is determined based on a relationship between the operator and the target words in respective sets of the operators corresponding to the determined words and the target words that have been determined to relate to the words;

wherein the determination server is programmed to determine the words which may correspond to the operator one-by-one concerning the plural words; and wherein the search sentence-generation server is programmed to iteratively generate an interim logical search sentence concerning the determined word every time the word corresponding to the operator is determined and to integrate the interim logical search sentence with a preceding interim logical search sentence that has already been generated until all determined words have been processed, thereby yielding a final search sentence.

6. The search sentence generation server system according to claim 5, wherein the determination server is configured to determine the words which potentially correspond to the operator one-by-one with respect to the plural words, and the search sentence-generation server is configured to generate a search sentence relating to the determined word every time the word corresponding to the operator is determined, and sequentially to perform integration for the generated search sentence; and-such that when a word included in the generated search sentence has a relation of being modified by a target word included in the search sentence that is a target of the integration, the integration is performed so that the word included in the generated search sentence is replaced with the search sentence that is the target of the integration, and the replaced search sentence is incorporated in a finally generated search sentence so as to take priority in the logical operation.

7. The search sentence generation server system according to claim 5, wherein the determination server is configured to determine the words which potentially correspond to the operator one-by-one with respect to the plural words, and the search sentence-generation server is configured to generate a search sentence relating to the determined word every time the word corresponding to the operator is determined, and sequentially to perform integration for the generated search sentence, and such that the integration is performed so that, based on relationship between a word included in the generated search word and a target word included in the search sentence that is a target of the integration, a given partial search sentence is incorporated in a finally generated search sentence so as to take priority in the logical operation.

8. The search sentence generation server system of claim 5, wherein the system is configured to cause the logical search sentence that is generated to be displayed at a user terminal.

9. A search sentence generation method executed in a search sentence generation server that generates a search sentence based on an input sentence of a natural sentence inputted by a user, the method comprising:

an input sentence-receiving step of receiving an input sentence;

an input sentence-analyzing step of analyzing the input sentence and decomposing the input sentence into plural words;

a determination step of determining a word corresponding to an operator based on the plural words and determining a target word relating to the determined word; and a search sentence-generation step of generating a search sentence corresponding to the input sentence by using a set of the operator corresponding to the determined word and the target words determined to relate to the word, wherein the search sentence-generation step includes generating the search sentence so that priority of a logical operation by a given operator is decided based on relationship between the operator and the target words in respective sets of the operators corresponding to the determined words and the target words determined to relate to the words;

wherein the words which may correspond to the operator are determined one-by-one concerning the plural words; and wherein an interim logical search sentence concerning the determined word is iteratively generated every time the word corresponding to the operator is determined and the interim logical search sentence is integrated with a preceding interim logical search sentence that has already been generated until all determined words have been processed, thereby yielding a final search sentence.

10. The logical search sentence generation system of claim 1, wherein the system is configured to cause the logical search sentence that is generated to be displayed at the user terminal.

11. The search sentence generation method of claim 9, further comprising causing the logical search sentence that is generated to be displayed at the user terminal.

* * * * *